July 22, 1969 D. W. NORWOOD Re. 26,632

PHOTOELECTRIC DEVICE FOR COMPARING DIFFERENT LIGHT INTENSITIES CHARACTERISTIC OF A PHOTOGRAPHIC SCENE

Original Filed Feb. 9, 1962 3 Sheets-Sheet 1

DONALD W. NORWOOD,
INVENTOR.

BY Knight & Rodgers
ATTORNEYS.

DONALD W. NORWOOD,
INVENTOR.

BY Knight & Rodgers
ATTORNEYS

DONALD W. NORWOOD,
INVENTOR.

BY Knight & Rodgers
ATTORNEYS

United States Patent Office

Re. 26,632
Reissued July 22, 1969

26,632

PHOTOELECTRIC DEVICE FOR COMPARING DIFFERENT LIGHT INTENSITIES CHARACTERISTIC OF A PHOTOGRAPHIC SCENE

Donald W. Norwood, 1470 San Pasqual St., Pasadena, Calif. 91106

Original No. 3,212,394, dated Oct. 19, 1965, Ser. No. 172,328, Feb. 9, 1962. Application for reissue Sept. 6, 1966, Ser. No. 582,194

Int. Cl. G01j *1/42*

U.S. Cl. 356—222 8 Claims

Matter enclosed in heavy brackets [ ] appears in the original patent but forms no part of this reissue specification; matter printed in italics indicates the additions made by reissue.

*ABSTRACT OF THE DISCLOSURE*

*A light meter for comparing the light intensity characteristics of a specific part of a scene with the light intensity characteristic of the whole scene or with another part of the scene. In one embodiment, an optical system transmits light from the whole scene to a light responsive means capable of controlling an electric meter in accordance with the amount of light received. The meter has a pointer and cooperating scale extending in opposite directions from a reference index. Manually variable means are provided to control the current to the meter to cause the pointer to coincide with the reference index. A second optical system transmits light from a specific part of the scene to a second light responsive means capable of controlling the meter in accordance with the amount of light received so that the light intensity characteristics of such part of the scene may be compared to the light intensity characteristics of the whole scene.*

The present invention relates generally to the art of light meters or indicators; and more particularly to a device for comparing different brightness characteristics of a scene to be photographed in order to determine suitability for transmission through the television medium, either directly or through an intermediate recording medium such as photographic film or magnetic tape.

An object of the present invention is to provide a device which will indicate to a cameraman the relative brightness of any important individual subject within a scene with respect to the overall brightness of the entire scene.

The medium of television presents to the cameraman some unusual problems. For example, a typical home television receiver has within itself automatic means which act to maintain the overall brightness of the picture on the screen at a predetermined level. This may be termed the reference level. Certain objects or areas within the scene being photographed and which are brighter than or darker than the reference level, within certain limits, will be shown in a satisfactory manner by the home television set. However, objects within the scene whose brightness departs from the reference level by more than an acceptable ratio of light values will be very poorly shown. Consequently, it is very advantageous for the cameraman when photographing the original scene to recognize first the reference level, or overall brightness of the entire scene, and then to determine the relationship thereto of the brightness of various important objects in the scene. The terms "photography," "photographic," and the like as used in the present specification and claims embrace any process for reproducing a scene, including television, for example, as well as the use of light sensitive emulsions.

The overall brightness of the original scene is established by two factors, namely the absolute brightness or brightness per unit area of each discrete portion in the scene and the relative size or area of such portion. Thus the reference level is the mean value of a complex presentation of brightnesses of various intensities and areas lying within the scene to be photographed.

For this reason it can be seen that the brightnesses of various important subjects within the area to be photographed relative to this reference level of brightness become of considerable importance. The various brightness ratios existing at the time of photographing the scene will largely determine the quality of the appearance of the images on the television receiver. Thus if the brightness of an actor's face, for example, has an acceptable ratio to the reference level, the reproduction of the face tones of the actor will be good. On the other hand if the ratio of brightness of the actor's face to the reference level lies outside certain limits, the reproduction of the face tones will be poor.

For example, consider a television actor standing on a stage in front of a dark back-drape. The actor's face is illuminated by a bright spotlight. In such a case, when a transmitted signal reaches the television receiver, the receiver automatically acts to raise the brightness level of the entire scene being photographed, including the large area of dark background. In so doing, it also raises the brightness level of the already too-bright face of the actor. The end result is an image on the receiver screen which shows a chalky-white face in which all the normal face tones and details are lost. The reverse effects occurs in the case of a very bright background, usually large in area, such as is encountered out-of-doors. Consider, for example, the situation in which a camera is pointed upward at an actor on a horse. The background behind the actor is a very bright sky. Compared with the sky, the actor's face is relatively dark. Under these circumstances, the television receiver acts automatically to reduce the brightness level of the entire scene, including the large sky area. In so doing, it also reduces the brightness level of the actor's face with the end result that the television receiver shows an image in which all normal face tones have been lost because the face is too dark.

The two foregoing examples illustrate typical frequently encountered situations and results which the cameraman wishes to avoid. These undesirable end results can be avoided only if brightness ratios in the original scene being photographed are maintained within acceptable ratios, that is, the brightness of the face area of the actor must be maintained within a certain predetermined ratio of light values to the brightness level of the entire scene. The cameraman has at his disposal various means for controlling these brightness ratios. These include arrangement of the composition of the scene with respect to suitable sizes of light and dark areas, the use of booster lights, reflectors, screens, and various other devices which influence the amount of lighting on a particular portion of a scene being photographed.

Accordingly, a general object of the present invention is to provide a device which gives to the cameraman exact information regarding the brightness ratios existing in any scene between the reference level and significant areas of that scene.

This object has been achieved in a light comparator constructed according to my invention by providing in combination an electrical circuit including light responsive means controlling current flow in the circuit as a function of light incident on said means, a visually indicating meter in the circuit having a scale for reading indications by the meter of the current flow in the circuit, variable means in the circuit adjustable to locate a current indication of the meter at a pre-determined position on the scale, and means subjecting the light responsive means separately and consecutively to light received from a first area to be photographed and to light received from a second area typically within the first area, to produce two separate current indications by said meter, which current indications can be compared by the cameraman with the aid of a novel scale associated with the meter to determine the brightness ratio of the two areas.

In a typical and preferred form of my invention, the light comparator includes two optical systems or light acceptance means which supply two different light intensities that are characteristic of a scene to be photographed. One such light acceptance means has a relatively wide angle so that its field of view is comparable to that of a typical standard camera lens, for example, on a professional 35 mm. motion picture camera. The other light acceptance means has a much narrower horizontal acceptance angle so that the field of view covered is relatively small. Typically this field of view is about large enough to encompass a person's face when the actor is located several feet from the instrument. It is preferable to associate with the comparator a view finder which enables the cameraman using the comparator to see the field covered by the two light acceptance means and to direct the comparator properly towards the desired areas within the scene to be photographed.

The electrical circuit includes light responsive means, preferably one or two light sensitive cells which respond to light incident thereon and received from the scene areas of interest. Switch means are provided in order to subject the light responsive means to light from one light acceptance means and then to light from the other acceptance means so that separate current readings may be had for light received through each of these light acceptance means.

Current flowing within the circuit is indicated by a suitable type of meter; and the circuit includes a variable means, for example a suitable resistance, which is manually operable to adjust the current flow within the circuit to any desired level thus enabling the meter to be set at a predetermined position on the scale associated with the meter in order to facilitate comparison of the brightness of the two areas within the scene to be photographed.

How the above and other objects of my invention are attained will be more readily understood by reference to the following description and to the annexed drawings, in which.

Figure 1:
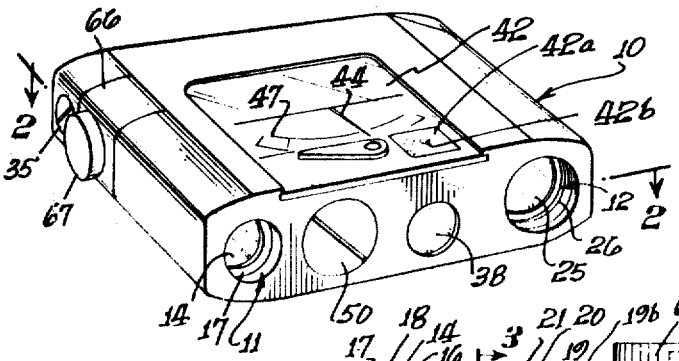
FIG. 1 is a front perspective view of a light comparator constructed according to the present invention.
Figure 2:
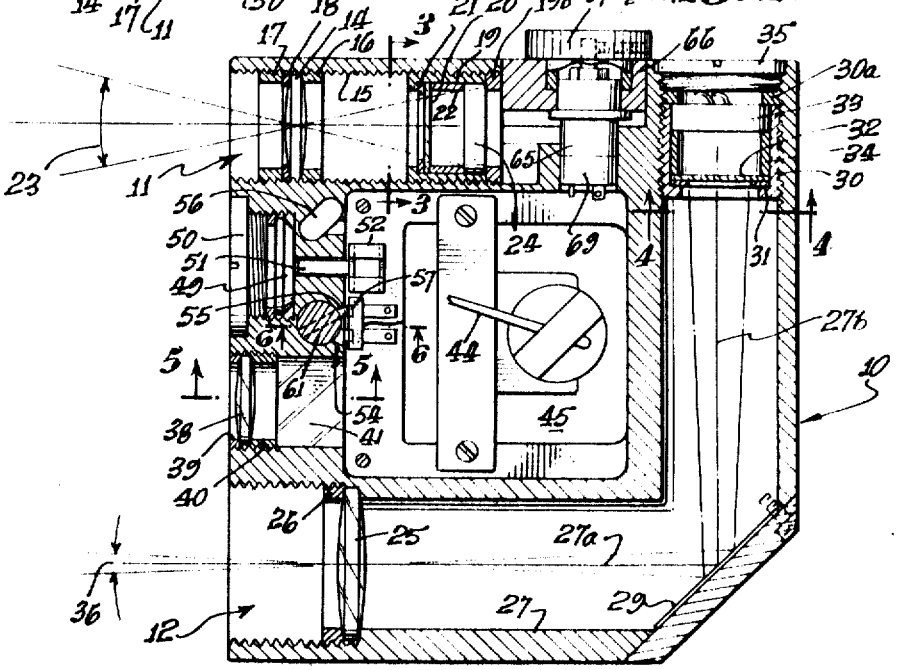
FIG. 2 is a horizontal median section thereof.

Referring now to the drawings and more particularly to FIGS. 1 and 2, wherein there is illustrated a presently preferred embodiment of my invention, it will be seen that the light comparator is enclosed in a housing, indicated generally at 10, which is preferably molded of a synthetic plastic material. At the forward side of the housing, which is seen in FIG. 1, are located two separate light acceptance means, indicated generally at 11 and 12. The first light acceptance means 11 is an optical system consisting of lens 14 located in an internally threaded bore 15 in housing 10 and held in place by a pair of externally threaded retaining rings 16 and 17. The two rings have central, circular apertures. Between ring 17 and the lens is a disc 18 having also a central circular aperture. The size of the aperture in ring 18 is selected to adjust the transmission of light through the optical system to bring about a desired balance between the two light acceptance means, as will be further explained.

Figure 3:
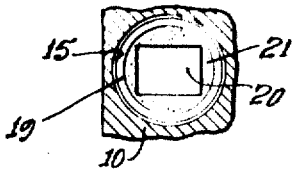
FIG. 3 is a fragmentary section and elevation on line 3—3 of FIG. 2.

Spaced inwardly from lens 14, and located within a passage 15 is a light cell assembly. The assembly includes hollow shell 19 generally cylindrical in form, and which is externally threaded to screw into the internally threaded passage 15. The cell housing has an aperture at the forward end for transmitting the incoming light, see FIG. 3. Located in a cylindrical cavity in the shell, and immediately behind the annular shoulder which defines the entrance aperture, is a thin opaque disk 21, preferably made of metal. This disk has a rectangular aperture, as shown in FIG. 3, and acts as a mask to limit or define the boundaries of the image transmitted by lens 14 to a field of view substantially that of a standard 50 mm. lens on a professional motion picture camera or the equivalent field of a television camera. To do this the horizontal light acceptance angle 23 is approximately 25°; but it will be understood that the angle can easily be changed by several degrees in either direction by the substitution of one or another of different interchangeable masks, in order to establish a field of view which is more exactly that of a given camera with which the brightness comparator is used. Behind mask 21 is a thin disk 20 of translucent diffusing material, such as opalescent cellulose acetate. There is a spacer ring 22 which slidably fits into the cavity in the shell. This serves to provide appropriate separation between the diffuser disk and the sensitive front surface of the light sensitive cell 24, which cell also fits into the cavity in the shell. The space between the diffuser disk and the light sensitive cell allows beneficial diffusion of the transmitted image before it reaches the photocell. Such diffusion counteracts any non-uniformity of sensitivity at different areas of the active surface of the photocell. There is a threaded retainer ring 19b which is screwed into the inner end of the threaded passage 15. This retainer ring acts to secure in shell 19 the assembly of elements while allowing the electrical leads from the cell to extend therefrom.

The second light acceptance means 12 is located in an angular passage 27 within housing 10. It is an optical system consisting of lens 25 which is held in place by externally threaded retaining ring 26 which engages internal threads in a portion of the light passage 27. Ring 26 holds lens 25 against a shoulder formed in the wall of the passage. The two legs of passage 27 are disposed at right angles to each other; and at the junction of the two legs of the passage there is located mirror 29 which is disposed at 45° to the axes 27a and 27b of each leg to the passage so that light entering through lens 25 is reflected by the mirror along axis 27b at 90° to the direction of the entry along axis 27a.

Figure 4:
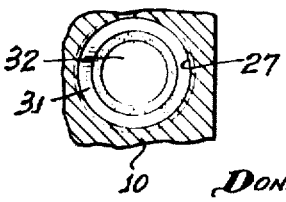
FIG. 4 is a fragmentary section and elevation on line 4—4 of FIG. 2.

The transmitted light reaches another light cell assembly similar to the one already described for the wide angle light acceptance system; and including threaded shell 30 holding the assembly and threaded into an end of passage 27 remote from lens 25. Inside shell 30 is mask 31, diffuser disc 32, light sensitive cell 33, and spacer 34 which spaces the cell from the diffuser. Ring 30a holds the several elements assembled in the shell. The mask, in this case, has a circular aperture, as shown in FIG. 4, for limiting the image transmitted by lens 25 to an area encompassed by a generally circular boundary. Thus the area is suitable to encompass an actor's face or other similar object in the scene. In this case the open end of passage 27 is closed by screw plug 35, whose only function is to close said open end.

By comparison with the first optical system described, the optical system constituting the second light acceptance means has a much longer focal length. In turn, this means that the horizontal light acceptance angle 36 is much smaller than the angle 23, the smaller angle preferably being of the general order of 1/10 of the larger angle. Thus angle 36 is preferably about 2.5° varying by a small amount either more or less for the corresponding range of sizes of angle 23. The reason for this arrangement will become more apparent from the discussion of the use of the light comparator.

Figure 5:
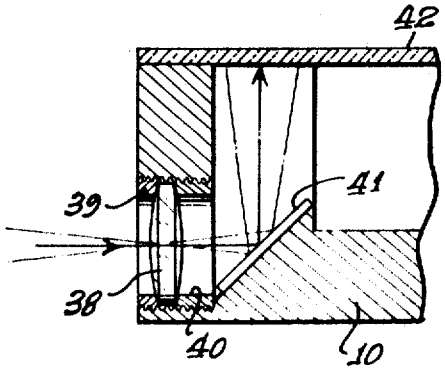
FIG. 5 is an enlarged vertical fragmentary section through the view finder on line 5—5 of FIG. 2.
Figure 6:
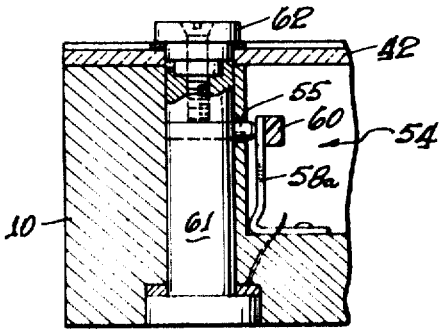
FIG. 6 is an enlarged vertical fragmentary section through an electrical switch taken on line 6—6 of FIG. 2.

It will be noticed that both light acceptance means open to the front of housing 10 and they face in the same direction so that they are simultaneously viewing the same scene or portions thereof. In order to show the user accurately the area covered by each of the light acceptance means, a view finder (see FIG. 5) is provided which consists of lens 38 held between two threaded retaining rings 39 and 40 which are screwed into a bore in the front side of housing 10. Rearwardly of lens 38 is mirror 41 which is inclined rearwardly and upwardly at an angle of 45° so that the image formed by lens 38 is reflected upwardly by the mirror and is projected onto a matte or frosted area of cover plate 42, shown in FIG. 1. The cover plate is preferably a sheet of transparent plastic and closes a large, generally rectangular cavity open to the top side of the comparator. Cover 42 has a matte surface area at 42a which serves as a screen upon which may be viewed the image formed by lens 38. The larger rectangular area indicated in FIG. 1 at 42a has dimensions which in combination with lens 38 present to the viewer an area which corresponds as closely as practical to the area viewed by the first or wide angle light acceptance means 11. Centrally of the area 42a is a circle 42b inscribed on the cover plate which denotes the boundaries of the area covered by the second or narrow angle light acceptance means 12. Although for purposes of illustration and convenience in use the circle 42b is located centrally of the area 42a, it will be realized that the area to be viewed for determining the brightness thereof in a scene to be photographed may not always be located centrally of the entire scene. In that case the comparator is moved by the user to bring the circle 42b into a position to cover the small area of interest in the image projected on the screen at 42a. In this respect, the view finder is very much like conventional view finders mounted on cameras and provided with markings to indicate an area smaller than the gross area shown and which is covered by a lens of different focal length than the one for which the gross area of the view finder is designed.

Visible through the transparent portion of cover plate 42 is the indicating needle 44 of an electrical current meter which is held within a suitable cavity in the housing 10. This electrical current meter is preferably of the D'Arsonval moving coil type and typically has a sensitivity such that full scale deflection of the indicator needle 44 is achieved with about 240 microamperes of current flow. It is preferable that the magnet poles are so designed that needle deflection proceeds in approximately arithmetically progressive steps when the current flow increases in geometrically progressive steps.

Figure 7:
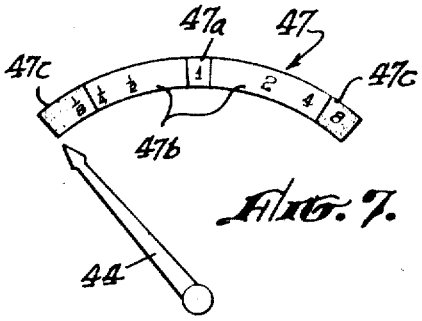
FIG. 7 is a diagrammatic plan view showing the indicating needle of the current meter and the scale and the markings thereon associated with the needle.

Cover plate 42 is transparent over at least sufficient area that indicator needle 44 may be viewed through the cover plate and there is associated with the needle a scale, as indicated in FIG. 7, visible through cover 42. This scale 47 bears suitable markings or indicia including a marking 47a at or near the mid point of the scale which becomes the reference level when the comparator is used. Thus brightness values either greater or lesser than the reference level are indicated by a needle position at one side or the other of the reference point. As shown in FIG. 7 lower brightness values are shown by a needle position to the left of reference point 47a which is designated "1" and greater brightness values are indicated by needle position to the right of the central reference point "1." Because of the design of the meter and electrical system, the total deflection of the needle, even for maximum readings, is brought to the center of the scale and the scale readings relative to that point are approximately geometrically progressive in their layout.

Figure 9:
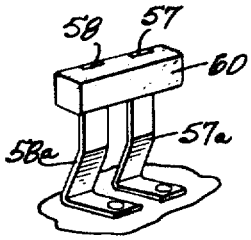
FIG. 9 is an enlarged perspective of the stationary electrical switch contacts, showing the contacts removed from the comparator housing.

An electrical battery 49 is located in a small cavity in housing 10, being held in place by screw plug 50. The plug can be unscrewed for removal and replacement of the battery at any time. Battery 49 is connected to one terminal of meter 45 by a pin conductor 51, slidably mounted in a bore in the housing with one end of the pin in contact with one terminal of the battery. The other end of conductor 51 is integral with a resilient mount 52 attached at its base to the instrument housing 10. Of course, battery 49 may be of any suitable type. However it has been found that a 1.3-volt battery of the type commercially designated Eveready No. E625 is satisfactory for use in this device. Other components of the circuit, which will be described and shown in FIG. 2 are switch 54 and transistor 56 which are located in individual cavities in the housing at location adjacent to battery 49 for convenience. Switch 54 is a single pole, double throw type having a moving contact 55 engageable with either one of fixed contacts 57 and 58, which are shown in greater detail in FIG. 9. These two contacts are integral respectively with one end of two resilient strips 57a and 58a attached at the other end to housing 10. The contacts are held in the spaced positions relative to each other at their upper ends by insulator block 60. The moving contact 55 is mounted on a rotatable post 61 to which is keyed or otherwise removably connected operating handle 62 immediately above cover plate 42 by which the moving contact is shifted between engagement with either one of the stationary contacts 57 and 58. The pressure exerted by spring strips 57a and 58a is employed to hold the switch in either one of the two terminal positions.

The transistor is preferably of the NPN type, such as, for example, the transistor commercially designated as General Electric No. 2N169A.

In another cavity in the housing is potentiometer 65 which, for accessibility, is mounted upon housing block 66. This block is removable from the housing, taking the potentiometer with it, for access to the potentiometer. The potentiometer is operated manually by an externally located knob 67 which, as shown in FIGS. 1 and 2, is preferably located at one side of the housing. The potentiometer shaft extends inwardly and is connected to an electrical switch 69 which is of the single pole, single throw type. The switch and potentiometer mounted as a unit in this manner are a well known combination of elements and need not be described in detail; but it will be understood that the two are so mounted that the switch contacts are closed at one end of the range of the potentiometer movement so that after first closing the contacts, the continued rotation of control knob 67 is effective to operate the potentiometer. Switch 69 being of the on-off type controls energization of the circuit.

Figure 8:
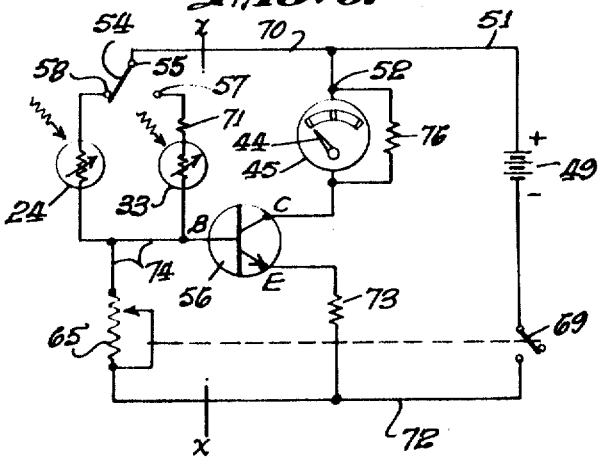
FIG. 8 is a circuit diagram for the electrical circuit in the preferred embodiment of the invention.

The electrical circuit is shown diagrammatically in FIG. 8. Starting with battery 49, the positive terminal of the battery is connected by conductor 51 to one terminal 52 of meter 45; and is connected through conductors 51 and 70 to the central terminal or movable contact 55 of switch 54. The fixed contacts 57 and 58 of switch 54 are connected respectively to one of the terminals of light sensitive cells 33 and 34, which are preferably of the photoconductive type. These cells 33 and 24 may be of the cadmium-sulphide type such as the cell known commercially as Polaris LDR–Cl. In the connection between switch contact 57 and one of the cells 33 there is preferably placed in series a resistance 71, the purpose of which will be mentioned.

Returning to battery 49, the negative terminal of the battery is serially connected through the contacts of switch 69 by conductor 72 to one terminal of a fixed resistor 73, of which the other terminal is connected to the emitter terminal of transistor 56. Conductor 72 is also connected to the control terminal and to one of the resistance terminals of potentiometer 65, which is thus connected as a variable resistance. The other terminal of the potentiometer is connected by conductor 74 to the base terminal of transistor 56. The two light sensitive cells 33 and 24 have their other terminals connected in parallel to the base terminal of transistor 56 and also to the potentiometer 65.

The electrical circuit is completed by a connection between the collector terminal of transistor 56 and the second terminal of meter 45 so that the meter is connected in series between the collector terminal of the transistor and the source of power 49. As will be further explained, it is also desirable to add resistor 76 connected in shunt across the two terminals of the current meter.

This circuit functions in a manner which allows very sensitive and active comparison of the relative resistances of the two light-sensitive cells 24 and 33. Basically the circuit is a grounded-emitter amplifier, the output of which is used to drive current meter 45. Bias current is supplied to transistor 56 through the impedance provided by either one of the two light-sensitive cells. Since variations in this impedance in the circuit, as will be further explained, cause corresponding changes in the bias current, the collector current driving the current meter also reflects the changes in the bias current, the collector current meter also reflects the change in impedance since the collector current is the bias current multiplied by the current gain of the transistor. Switch 54 allows either one of the two light-sensitive cells 24 and 33 to be active in the circuit to provide an impedance at the input terminals of the transistor. At the same time, since switch 54 is a double throw switch, the other cell is excluded from the circuit and therefore only one cell is active in the circuit at a time.

As already mentioned, each of cells 24 and 33 is of the photo-conductive type in which the resistance of the photo-cell varies with the intensity of light incident on its photo-sensitive surface. In turn, the resistance of the photo cell which is active in the circuit modifies the value of the bias current supplied to the transistor; and, other conditions remaining constant, a bias current is modified solely as a function of the resistance of the photo-cell in the circuit. Consequently, by comparing the resistances of the two photo-cells, one after the other, the output current from the transistor supplied to current meter 45 gives accurate information about the relative values of the intensity of light incident on each of the cells.

The sensitivity of the circuit can be changed by adjustment of potentiometer 65. This potentiometer acts to modify, by shunting more or less bias current from the control junction of the transistor, the bias which is established on the base of the transistor through the resistance of the photo cell in circuit. When the bias on the base is decreased by increasing the current shunted from the transistor, the current flowing through meter 45 is decreased. Conversely, when the bias on the base is inceased by shunting less current from the control junction of the transistor, the current reaching the meter 45 is increased. Actuation of switch 69 occurs at that end of the potentiometer movement at which its resistance is lowest, and at which the system therefore has minimum sensitivity. In use, the potentiometer is usually adjusted to make the circuit suitably sensitive to accommodate the resistance values of the two cells 24 and 33 under the range of light values incident on the cells at the time the meter is being used, as will be further explained. Compatible with the assumed battery voltage, typical values suitable for resistors 73 and 76 and potentiometer 65 are 1,500, 15,000 and 10,000 ohms respectively; and meter 45 preferably has an internal resistance of about 1,500 ohms with full scale deflection at about 240 microamperes.

Having described the construction of a light comparator embodying a preferred form of the present invention, I will now describe the use and operation of the instrument. In use, the first step is to energize the circuit by closing switch 69 which is a simple on-off switch which serves to disconnect battery 49, the source of power, from the circuit. Switch 69 is closed by the first portion of the rotation of knob 67 which turns the shaft extending through potentiometer 65.

Next, the device is pointed toward the scene to be photographed, directing the first light acceptance means toward the scene to receive light therefrom. By means of the view finder, the field covered by the first light acceptance means is shown upon a matte surface of cover 42, enabling the user to encompass the entire field which will be photographed. For this reason, as already explained, the horizontal angle 23 is of a size to cover substantially the same field as that covered by the motion picture or television camera. Switch 54 is now moved to the position shown in FIG. 8 in which the movable contact engages fixed terminal 58 which places light sensitive cell 24 in the circuit, since it is this cell that is receiving light through the first light acceptance means. With the instrument held pointed toward the scene, control knob 67 is gradually turned to increase the sensitivity of the circuit until the pointer 44 reaches the midpoint of scale 47. This scale is shown in detail in FIG. 7 and includes an area 47a at the center of the scale which is used to designate the reference value of the current passing through the meter; and when the current level reaches such a point that the deflection of needle 44 brings the needle to this reference point on the scale, the user stops moving control knob 67.

The user next moves switch 54 to the alternate position in which the movable contact engages fixed terminal 57, thus placing the other photo cell 33 in the circuit and removing the first photo cell 24 from active participation in the circuit. The operator now aims the second light acceptance means 12 at a particular area, within and relatively smaller than the entire scene to be photographed, and the brightness of which is to be compared with the brightness of the overall scene. Typically this limited area would be the face of an actor and it is for this reason that the acceptance angle 36 is made smaller for light acceptance means 12 than the corresponding angle of the first light acceptance means and mask 31 is made circular to conform in general to the shape of the area to be studied, thus rejecting to some extent extraneous light. Of course, the exact area being viewed by the second light acceptance means is indicated to the user by registering the area within circle 42b on the viewing screen provided by cover 42.

It is apparent that it is convenient to have both light acceptance means facing forwardly in the same direction; but this is not a necessary arrangement.

Pointer 44 of current meter 45 now deflects to a position which indicates on scale 47 the relative brightness of the selected small subject area to the average brightness of the entire scene, the latter value being the reference level of brightness which was established at reference point 47a by bringing pointer 44 to that point on scale 47. After a first limited area within the scene has been studied, if desired, the instrument can be aimed in turn at various light and dark areas throughout the scene to be sure that none of them depart by more than an acceptable amount from the reference or average level of brightness. In each case, the relative brightness will be directly indicated by the reading of meter needle 44 on scale 47. This provides an exact analysis of the scene with respect to all brightness relationships. Whether these areas studied are suitable for transmission or recording by the camera is thus clearly indicated to the cameraman.

Also, brightness relationships between various small areas may be observed and compared to each other as well as the brightness relationship of each small area to the entire scene. The sensitivity control may be operated to place the indicator at any selected position on scale 47, such as reference point 47a, while the meter is aimed at any selected small area. A subsequent reading on another area shows the brightness relationship of the two areas.

Interpretation of the position of indicator needle 44 is facilitated by the indicia on scale 47. If the brightness values of the small area studied are greater than those of the reference level, the indicator needle swings farther to the right than the reference point on the scale. Accordingly, subdivisions of the scale to the right bear the numeral markings 2, 4, 8, and so forth, indicating that at those points the brightness values are two times, four times, eight times, etc. the average brightness of the entire scene. In the same manner, if the light from the small area is less than that of the reference level of brightness established by the entire scene, the needle 44 deflects to some position to the left of central area 47a. Since these brightness values are less, they are indicated by markings of one-half, one-fourth, one-eighth, etc.

It has been found from experience that the maximum brightness values in a scene, to be photographed satisfactorily, should not be more than forty times the minimum brightness values. In order to obtain equal departure both above and below the reference or mean light values, the maximum brightness values should be not more than 6.3 times the brightness of the scene reference level and the darkest area should be not less than .16 times the brightness of the reference level. In order to indicate this directly to the cameraman by the scale 47, there is an area 47b at each side of the central area 47a which may be colored (green for example) or otherwise marked to indicate that the needle is within the accepted range of values. Thus the extreme ends of the two areas 47b occupy positions which indicate an extreme range of brightness values of substantially forty to one. Brightness values outside of this range are unacceptable for satisfactory photography and correspondingly the areas 47c may so indicate. For this purpose they are appropriately marked as by coloring them red, to warn the user that the brightness values recorded are outside of the acceptable range. When the needle 44 registers a brightness value in the red areas 47c this denotes nonsuitability for television transmission or motion picture recording and indicates to the cameraman the need for adjustment of brightness values in the scene in order to achieve acceptable pictures.

From the above description of the use of the instrument, it will be seen that sensitivity or range of the circuit is preferably adjustable to bring to mid-range value one of the group of resistances (cells 24 and 33) to be tested since this allows testing for both higher and lower values of the resistance provided by the second tested cell 33. Inclusion of the fixed resistor 73 in series with the emitter terminal of the transistor provides circuit characteristics such that the pointer 44 does not have the otherwise common tendency to over-run the high end of scale 47 when the resistance in the test circuit provided by the light sensitive cell is substantially lower than that for which the mid-scale adjustment was made.

It has been found that the use of relatively high resistance values for resistor 73, tend to decrease the deflection of indicator needle 44 toward the high end of the scale away from the mid-point 47a. This is quite desirable and enables the circuit to be designed for measuring resistance ratio up to the desired limits of brightness values, in this case one-eighth to one on the low side of the mid-point and eight to one on the high side of the mid-point of the scale.

Since the circuit is, in effect, something of a bridge circuit, the resistances in the circuit exterior to meter 45 at times assume very high values, thus diminishing the damping effect on the needle usually associated with a current indicator in the ordinary circuit. To provide such a damping effect, a fixed resistance 76 has been provided in parallel with current indicator 45.

One of the problems encountered in the construction of an instrument such as this, is the fact that there is considerable variation in the resistance exhibited by mass-produced photo cells, one from another, when they are subjected to the same illumination. This unfavorable effect is compounded by the fact that the ratio of resistance values between any two cells may not be constant at different levels of illumination. The ratio may progressively increase or decrease as the illumination level is increased. For this reason, it is necessary to equalize the effects from the two systems previously described throughout the normal range of brightness values which are expected to be encountered by the instrument. Equalization is accomplished in this instrument by novel optical and electrical means which cooperate to produce the desired result.

The two light sensitive cells 24 and 33 selected for a given instrument are first compared at a low level of illumination. The one with less internal resistance is selected for the narrow angle light acceptance system 12. The other cell is placed in the wide angle light acceptance system 11. A wide angle lens system normally transmits a brighter image, without going to an excessive diameter of lens, than does a narrow angle system. For this reason the diameter of the wide angle lens can be selected so as to give it several times the f-stop transmission value of the narrow angle lens. The brighter image transmitted on to the higher resistance cell will reduce the resistance of that cell until it is of the same order as the cell in the narrow angle system. Final exact adjustment at the low light level is achieved by means of mask 18 which is placed close to the wide angle lens 14. This mask has an aperture of a size selected to control the light transmission of the lens. The desired end effect is that the extra brightness of the image transmitted to cell 24 will make the resistance of that cell exactly equal to the resistance of cell 33 under conditions where both systems are transmitting in turn the image of a plane surface uniformly illuminated to a low brightness level.

The second step in the equalization occurs when the test surface is illuminated by intense, upper-limit, illumination so as to provide very bright images for both cells. The result will be low resistances as exhibited by both cells. However, one cell will probably be found to have a somewhat lower resistance then the other. Electrical compensation is made for this characteristic by introducing fixed resistor 71 in series with the individual cell which has the lower resistance. The value of resistor 71 should be exactly, or as closely as possible, the difference between the resistances of the two cells at this bright image condition. In a typical case this was about 50–60 ohms. The use of resistor 71 equalizes the two alternative circuits containing cells 24 and 33 at the maximum brightness condition. Where image brightness is decreased and both cells increase in resistance, the effect of the fixed resistor in relation thereto becomes progressively less, until it finally has negligible influence at the point of lowest brightness and highest cell resistance. The cell may reach a maximum resistance in the neighborhood of one megohm. At this point, under which the first equalization between systems by optical means, was made, the systems will also still be found to be in correct equalization. The two cells are in substantial balance at all intermediate points of brightness.

The invention provides an unusual combination of two desirable features, usually considered incompatible. It provides widely spaced scale units and can also handle brightness values over a great range. The scale units cover a band of brightness such as that usually encountered in a single typical scene and indicating the range of brightness values acceptable within the single scene being photographed. It also provides means to shift that band of brightness values to higher or lower brightness levels. For example, from low brightness values as in a dimly lit interior scene up to high intensity brightness values as encountered outdoors under bright sunlight.

Figure 10:
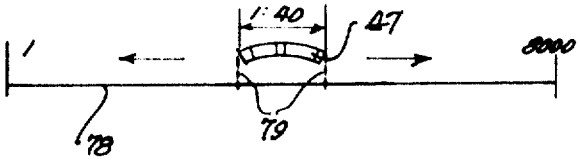
FIG. 10 is a diagram illustrating the range of brightness values compared against a possible range of brightness values.

This situation is shown diagrammatically in FIG. 10. Line 78 represents a scale covering the maximum range of light values from a dim interior scene to a bright sea or desert scene. The range of light values is approximately 1:8000. On this imaginary scale, scale 47 of the comparator covers only a very narrow band as indicated by lines 79. The width of this band is greatly exaggerated in relation to scale 78 for purposes of illustration; and the band range is relatively limited as it encompasses essentially the range of brightness values acceptable in a single scene. This band is necessarily movable up or down scale 78 to cover the portion thereon of instant interest for any scene. This is done physically by adjusting the sensitivity of the circuit using the potentiometer 65.

Exposure to intense brightness while the sensitivity adjustment is set for low level brightness could, unless proper precautions were taken, cause serious overload of the indicator and could possibly burn out the coil of the current indicator. A typical situation of this character would result if the instrument were used indoors in dim light, turned off, and later turned on under conditions of intense outdoor light without first readjusting the sensitivity control.

However, the present invention has been designed to eliminate this possibility. Means for this includes an interlock arrangement between the on-off switch 69 and the sensitivity control 65. The common control knob 67 for both controls a common shaft which not only turns the switch on and off but operates the potentiometer. These latter two elements are so arranged that when the switch is turned to "off," the sensitivity control is automatically turned to the least sensitive position. Consequently when the switch is again turned to "on" by the common control knob, the sensitivity as determined by potentiometer 65 is at the least sensitive position. Continued rotation from the "on" position of the switch is required to increase the sensitivity until a range suitable for the particular band of brightness being measured is shown by the electrical indicator.

A variational form of the invention is illustrated in FIGS. 11–15 which produces the same results and is operated in the same manner but which involves certain changes in the physical disposition of the parts and in the electrical circuitry. These changes center about a change in the switch means for switching from one light acceptance means or optical system to the other. In the embodiment described above, the change-over from one light acceptance means to the other is accomplished by means of electrical switch 54 which activated in turn different electrical elements (cells 24 and 33) in the circuit and thus the change-over from one light acceptance means to the other was effected without any other mechanically moving parts. In the present arrangement, a light switch is used which has the effect of switching from one light beam to the other, the light beams being directed in sequence upon a single light sensitive element in the electrical circuit. Because of the substantial similarity between the two embodiments of the invention, the same reference numbers are applied in the present embodiment as in the one earlier described where the parts are of the same construction and function; and the following description of the second embodiment will be limited to the differences between the two embodiments.

Figure 11:
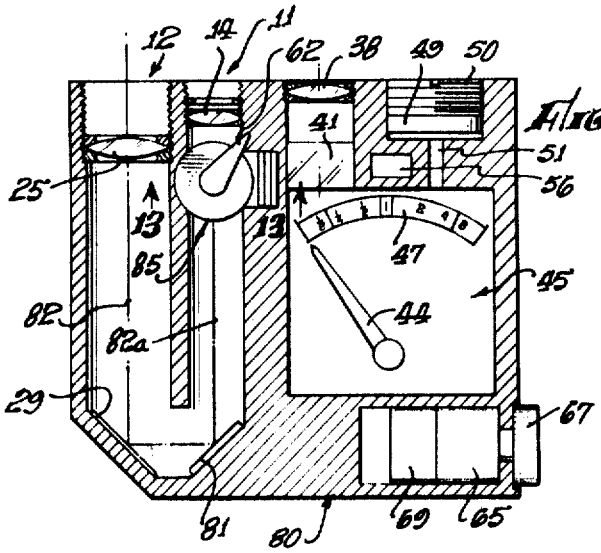
FIG. 11 is a horizontal median section through a light comparator embodying a modified form of the invention.

As will be seen by reference to FIG. 11 showing the second embodiment in horizontal median section, the chief components of the instrument have been rearranged somewhat, bringing the two light acceptances systems 11 and 12 closer together. The current meter, the view finder, and the battery have been shifted toward one side of the housing. Consequently housing 80 provides essentially the same cavities and light passages as does housing 10 but with a change in the location of these parts.

The narrow angle optical system 12 not only includes a first reflecting mirror 29 but a second reflecting mirror 81 so that the optical axis of the system undergoes two reflections each of 90° with the result that the end sections 82 and 82a of the optical axis are parallel, or substantially so, to each other. Mirror 81 is arranged at 45° to the axis of the incident light, mirrors 29 and 81 being at 90° to each other to effect the desired change in direction of the light beam of the narrow angle light acceptance means 12. After the second reflection, the light moving along axis 82a is projected along an axis that if extended would substantially coincide with the axis 84 of the wide angle light acceptance means 11. This wide angle optical system is thus projecting light into the housing in a direction opposite to the terminal portion of the narrow angle optical system.

This arrangement causes light from both systems to reach a light valve or switch indicated generally at 85 which can be actuated by operating handle 62 to switch the instrument from one light acceptance system to the other.

Figure 13:
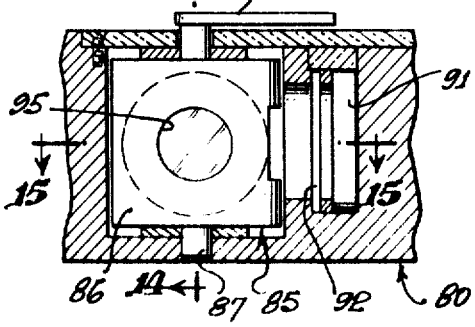
FIG. 13 is an enlarged fragmentary vertical section of the light valve on line 13—13 of FIG. 11.
Figure 14:
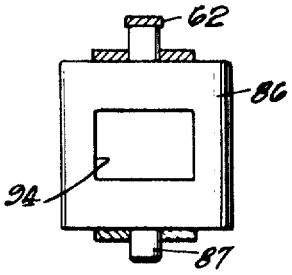
FIG. 14 is a combined section and elevation of the rotating mask of the light switch taken on line 14—14 of FIG. 13.
Figure 15:
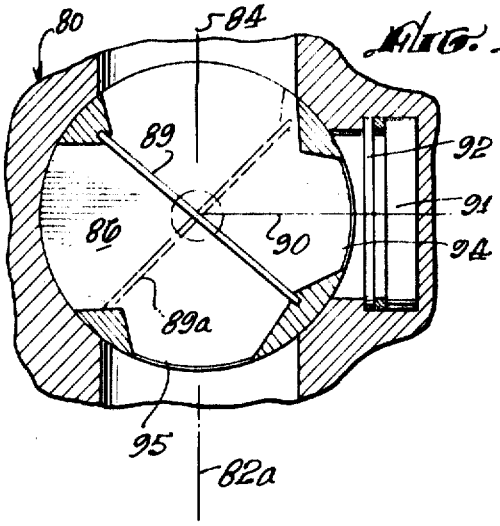
FIG. 15 is a further enlarged horizontal section of the rotating mirror and mask assembly or light switch taken on line 15—15 of FIG. 13.
Figure 16:
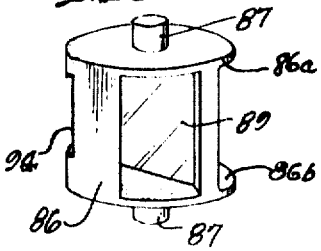
FIG. 16 is a perspective of the rotating drum and mirror assembly of FIG. 14 viewed from the far right side thereof.

This light valve is shown in greater detail in FIGS 13, 14, 14 and 16 and comprises a cylindrical drum 86 having upper and lower parallel end plates 86a and 86b carrying respectively upper and lower pivot pins 87 to establish an axis of rotation perpendicular to the optical axis 82a about which the cylindrical drum may be turned by handle 62 which is attached to the upper pivot pin 87. As may be seen particularly in FIG. 15, a two surface reflecting mirror 89 is placed within the cylindrical mount and is movable by rotation of the mount between two positions spaced 90° apart. In the position shown in full lines in FIG. 15, the mirror receives light along optical axis 84 and reflects it from the first surface at 90° along axis 90 to fall upon the light sensitive cell 91. It is preferred to locate immediately ahead of cell 91 a suitable light diffusing element 92 which spreads the light over the surface of the cell and minimizes any undesirable effects which might be caused by a lack of uniform sensitivity of the cell to light incident thereon.

When mount 86 is rotated counterclockwise, viewed in FIG. 15, to move mirror 89 to the dotted line position 89a, the wide angle light acceptance system is switched out of operation and the narrow angle light acceptance system is switched into operation. In this latter position of the mirror, light projected along axis 82a on to the mirror is reflected by the second mirror surface at 90° from its original direction along axis 90 to reach light sensitive cell 91.

At one side of cylindrical mount 86 is rectangular opening 94 (FIG. 14) which defines the boundaries of the light beam reaching photo-sensitive cell 91 through the wide angle light system 11. This opening 94 corresponds to mask 21 in the first embodiment of the invention and is designed to outline the larger field from which light is received and which is essentially the entire scene to be photographed. The wall of cylindrical mount 86 also has a second aperture 95 which is circular, as shown in FIG. 13. This aperture defines the boundaries of the light beam reaching photo-sensitive cell 91 through the narrow angle optical system 12 and outlines the smaller field, within the larger one, which is to be studied for its brightness value with reference to the average brightness of the entire scene. Thus this opening 95 corresponds in function to the mask 31 of the embodiment described above. Diametrically opposite apertures 94 and 95 the drum is open for the full height between end plates 86a and 86b to admit light to the reflecting mirror.

Figure 12:
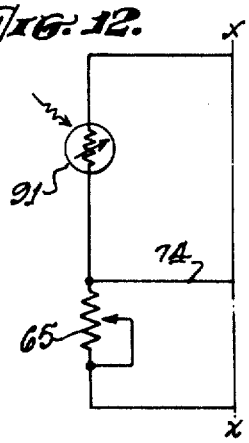
FIG. 12 is a partial circuit diagram illustrating the modifications in the electrical circuit for the light comparator of FIG. 11.

In the present embodiment there is a need for only a single light sensitive cell 91 which is located in the circuit as shown in FIG. 12. The portion of the electrical circuit to the right of the line x—x in FIGS. 8 and 12 is duplicated in both circuits and consequently is omitted in FIG. 12. The only difference between the circuits in the embodiments lies in the portion of the circuit to the left of the line x—x and it will be seen that this is limited to the omission of electrical switch 54, one of the two light sensitive cells, and balancing resistor 71.

From the foregoing description of the construction of the second embodiment of my invention, it will be seen that the operation of the instrument is the same as previously disclosed, at least as far as the user is concerned. In operation he switches from one light acceptance means to the other by manipulation of operating handle 62. Whereas in the embodiment first described this handle operated an electric switch, in the later embodiment this operating handle moves a light switch. In either case the ultimate result is the same in that the current through meter 45 is a function of the light reaching a photo-sensitive element through one of the optical systems and the relative brightness is recorded by the position of indicator needle 44. From the foregoing description it will be seen that various changes may be made in the arrangement and construction of the component parts of the light comparator without departing from the spirit and scope of my invention. Accordingly, it is to be understood that the foregoing description is considered to be illustrative of, rather than limitative upon, the invention defined by the appended claims.

I claim:

1. In a photoelectric light comparator for comparing different light intensities characteristic of a scene to be photographed, the combination comprising structure forming an electrical circuit, light responsive means actuable to modify current flow in the circuit as a function of light incident upon said means, optical means actuable to [the] subject the light responsive means to a first light intensity characteristic of the entire scene to be photographed, and actuable to subject the light responsive means to a second light intensity characteristic of a selected portion of interest within said scene to be photographed, an electrical meter associated with said circuit and having a scale with an index mark intermediate the length of the scale designating a reference index and having a visual indicator movable progressively relative to the scale in one direction in response to increasing value of current in the circuit, coincidence of the indicator and reference index denoting a predetermined current value, the total length of the meter scale corresponding to a range of current values that represents only a small fraction of the normal range of photographic light intensities, and manually variable means [electrically connected with said circuit and] actuable to modify continuously the current [therein] *in the circuit,* said variable means having a range of variation sufficient to produce in the circuit said predetermined current value at any value of said first intensity within said normal range of photographic light intensities, said meter scale extending in both directions from said reference index distances at least corresponding to the maximum and minimum photographically acceptable values of the ratio of said second intensity to said first intensity.

2. In a photoelectric light comparator for comparing different light intensities characteristic of a scene to be photographed, the combination comprising a transistor having base, emitter and collector, a source of direct current power having two power terminals, an electrical meter having a predetermined resistance value and having a scale and a visual indicator movable relative to the scale in response to the current through the meter, said scale having a reference index intermediate its length denoting a predetermined current value and having two series of scale marks extending in opposite directions from the reference index denoting designated ratios of the meter current to said predetermined current value, a resistance element having approximately said resistance value, circuit means connecting the meter in series between the transistor collector and one terminal of the power source and connecting the resistance element between the transistor emitter and the other terminal the power source, photosensitive means having an electrical resistance substantially inversely proportional to the intensity of light incident thereon, a manually variable resistance, circuit means connecting the photoresistive means between said one power terminal and the transistor base, and connecting the variable resistance between the other power terminal and the transistor base, means actuable to subject the photoresistive means to a first light intensity characteristic of an area to be photographed, said variable resistance having a range of variation sufficient to produce in the meter said predetermined current value at any value of said first light intensity within the normal range of photographic light intensities, and means actuable to subject the photoresistive means to a second light intensity characteristic of a selected portion of interest within said area to be photographed.

3. In a photoelectric light comparator for comparing different light intensities characteristic of a scene to be photographed, the combination comprising a transistor having base, emitter and collector, a source of direct current power having two power terminals, an electrical meter having a visual indicator movable relative to the scale in response to the current through the meter, said scale having a reference index intermediate its length denoting a predetermined current value and having two series of scale marks extending in opposite directions from the reference index denoting designated ratios of the meter current to said predetermined current value, circuit means connecting the meter in series between the transistor collector and one terminal of the power source and connecting the transistor emitter to the other terminal of the power source, photoresistive means having an electrical resistance substantially inversely proportional to the intensity of light incident thereon, a manually variable resistance, circuit means connecting the photoresistive means between said one power terminal and the transistor base, and connecting the variable resistance between the other power terminal and the transistor base, means actuable to subject the photoresistive means to a first light intensity characteristic of an area to be photographed, said variable resistance having a range of variation sufficient to produce in the meter said predetermined current value at any value of said first light intensity within the normal range of photographic light intensities, and means actuable to subject the photoresistive means to a second light intensity characteristic of a selected portion of interest within said area to be photographed.

4. In a photoelectric device differentially responsive to light received from different areas of a scene to be photographed, the combination comprising first optical means having an optical axis and adapted to image a scene by light incident forwardly along said axis, reflective means mounted for movement between first and second working positions and acting in said first position to direct said image-forming light along a secondary axis transverse of said optical axis, second optical means adapted to image at least a portion of said scene by light incident along a second optical axis parallel to and offset from the first said axis, the local length of the second optical means being greater than that of the first, means mounted in the path of the image-forming light of the second optical system and acting to direct that light rearwardly along the first said optical axis toward said reflective means, said reflective means acting in its second position to reflect said rearwardly directed light along said secondary axis, a light responsive element mounted on the secondary axis and responsive to light received from the first optical means in first position of the reflective means and responsive to light received from the second optical means in second position of the reflective means, and electrical means connected to the light responsive means for indicating the response thereof.

5. The combination defined in claim 4, and wherein said reflective means comprises a frame and a reflective element fixedly mounted on the frame, the frame being rotatably mounted on a pivot axis substantially perpendicular to the first said optical axis and to the secondary axis for rotation through approximately 90° between said first and second positions of the reflective means, said combination including first diaphragm means having a generally rectangular aperture and mounted to limit the effective area of the image formed by the first optical system in first position of the reflective means, and second diaphragm means having a generally circular aperture and mounted to limit the effective area of the image formed by the second optical system in second position of the reflective means.

6. The combination defined in claim 5, and wherein said reflective element comprises a plane mirror having an optical reflective coating on both faces thereof and mounted substantially on the pivot axis of said frame, the first diaphragm being mounted on the frame on one side of the reflective element and in a plane at substantially 45° to one reflective face thereof, and the second diaphragm being mounted on the frame on the other side of the reflective element and in a plane at substantially 45° from the other face thereof and at substantially 90° from the plane of the first diaphragm.

7. In a photoelectric light comparator for comparing different light intensities characteristic of a scene to be photographed, the combination comprising first and second light acceptance means, of which one has a larger light acceptance angle than the other, and light responsive means which comprise two photoresponsive elements responsive to light from the respective light acceptance means, and electrical circuit means which include manual switching means actuable to render one or the other of the photoresponsive elements selectively operative in the circuit means, an electrical meter associated with the circuit means and having a scale with an index mark intermediate the length of the scale designating a reference index and having a visual indicator movable progressively relative to the scale in one direction in response to increasing value of current in the circuit means, coincidence of the indicator and reference index denoting a predetermined current value, the total length of the meter scale corresponding to a range of current values that represents only a small fraction of the normal range of photographic light intensities, and manually variable means electrically connected with said circuit means and actuable to modify continuously the current therein, said variable means having a range of variation sufficient to produce in the circuit said predetermined current value in response to received light of any intensity within the normal range of photographic light intensities, said meter scale extending in both directions from said reference index distances at least corresponding to the maximum and minimum photographically acceptable values of the ratio of light intensities received from the respective light acceptance means.

8. In a photoelectric light comparator for comparing different light intensities characteristic of a scene to be photographed, the combination comprising first and second light acceptance means, of which one has a larger light acceptance angle than the other, and light responsive means which comprise a photoresponsive element and means manually actuable to render said element selectively responsive to light received from one or the other of the respective light acceptance means, electrical circuit means which include said photoresponsive element, an electrical meter associated with the circuit means and having a scale with an index mark intermediate the length of the scale designating a reference index and having a visual indicator movable progressively relative to the scale in one direction in response to increasing value of current in the circuit means, coincidence of the indicator and reference index denoting a predetermined current value, the total length of the meter scale corresponding to a range of current values that represents only a small fraction of the normal range of photographic light intensities, and manually variable means [electrically connected with said circuit means and] actuable to modify continuously the current [therein] *in the circuit means,* said variable means having a range of variation sufficient to produce in the circuit *means* said predetermined current value in response to [received] *photographic scene* light of any intensity within the normal range of photographic light intensities, said meter scale extending in both directions from said reference index distances at least corresponding to the maximum and minimum photographically acceptable values of the ratio of light intensities received from the respective light acceptance means.

(References on following page)

References Cited

The following references, cited by the Examiner, are of record in the patented file of this patent or the original patent.

UNITED STATES PATENTS

| | | | |
|---|---|---|---|
| 1,795,626 | 3/1931 | Watkins | 88—16 |
| 2,285,761 | 6/1942 | Tonnies | 95—10 |
| 2,750,453 | 6/1956 | Pritchard | 95—10 |

| | | | |
|---|---|---|---|
| 3,001,460 | 9/1961 | Broschke | 95—10 |

RONALD L. WIBERT, Primary Examiner

R. J. WEBSTER, Assistant Examiner

U.S. Cl. X.R.

95—10; 250—209, 214; 324—96